Aug. 16, 1927.
G. GATIAL
1,639,175
CUSHION TIRE
Filed Jan. 23. 1926
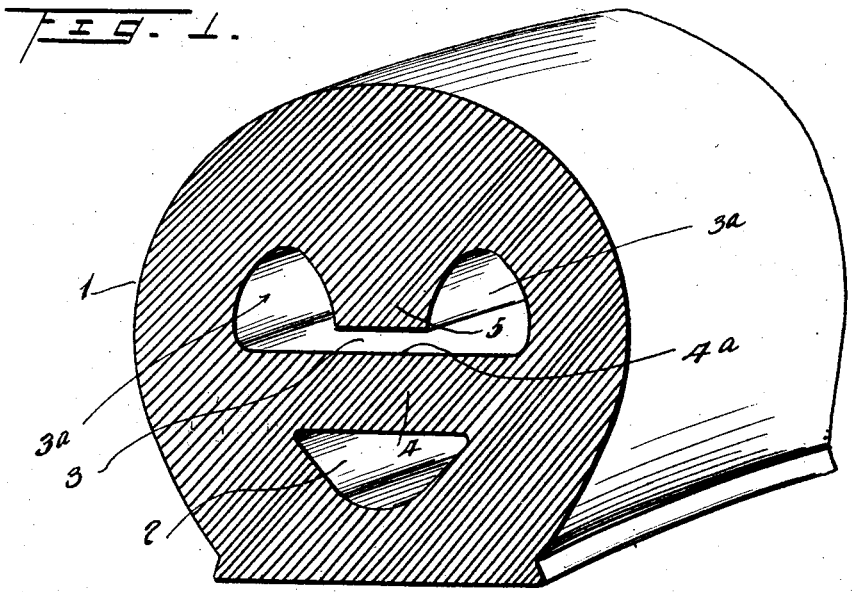
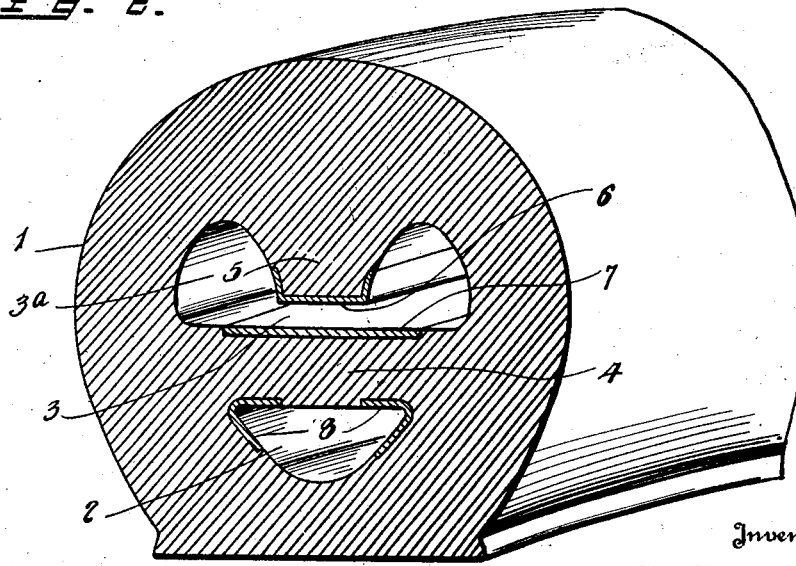
Inventor
G. Gatial.

Patented Aug. 16, 1927.

1,639,175

UNITED STATES PATENT OFFICE.

GEORGE GATIAL, OF TARENTUM, PENNSYLVANIA, ASSIGNOR OF ONE-HALF TO STEVE MATIASKO, OF TARENTUM, PENNSYLVANIA.

CUSHION TIRE.

Application filed January 23, 1926. Serial No. 83,238.

This invention relates to certain new and useful improvements in cushion tires of the type wherein the employment of the usual pneumatic tube is eliminated, the tire being provided with a series of circumferentially arranged non-communicating passages or air pockets for increasing the cushioning properties of the tire.

A further object of the invention is to provide a solid cushion tire formed with circumferentially extending concentric passages or pockets defining a circumferential wall between the pockets with a centrally positioned inwardly directed rib carried by a wall of the outer pocket to engage the intermediate wall and relieve strains on the tire.

A further object of the invention is to provide in a cushion tire of the type above set forth, the provision of wear plates of any preferred material to prevent frictional or rubbing contact of the abutting walls of the pocket which is occasioned when the tire is under pressure or load.

With the above and other objects in view that will become apparent as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a fragmentary perspective view, partly in section of a portion of a tire constructed in accordance with the present invention, showing the concentric circumferentially extending pocket formed in the solid tire, and Figure 2 is a similar view showing the opposed faces or walls of the pockets that are moved into contact provided with anti-friction wear strips or plates.

Referring more in detail to the accompanying drawing, and particularly to Fig. 1 the reference numeral 1 designates a rubber tire of the solid type provided with concentric circumferentially extending inner and outer pockets 2 and 3, the outer pocket 3 being of a greater diameter than the inner pocket while the concentric pockets are separated by the intermediate circumferentially extending wall 4. The outer wall of the pocket 3 carries a centrally positioned inwardly directed circumferentially extending rib 5 normally spaced from the adjacent face 4ª of the wall 4, the rib 5 defining side pockets 3ª.

When the tire 1 is under pressure or load, the rib 5 is moved inwardly toward the wall 4 to be partially supported thereby while the walls of the pocket 2 at the inner side of the tire will partially collapse, thereby increasing the cushioning properties of the tire to the exclusion of the usual pneumatic inner tube.

The use of wearing plates to eliminate direct contact between certain walls of the pockets when the tire is under pressure or load is contemplated, and such wear plates are shown in Fig. 2, the inner side of the rib 5 being inclosed by a channel-shaped wearing plate 6 that is opposed to the wearing plate 7 set into the outer side of the intermediate wall 4 adjacent the rib 5. It is to be noted that the wearing plate 7 is of a width greater than the width of the wearing plate 6 so that lateral movements of the rib 5 and the outer side or tread of the tire will be permitted while the wearing plates 6 and 7 maintain contact irrespective of their relative positions. The pocket 2 in the tire being substantially triangular in cross section, V-shaped wearing plates 8 are set into opposite corners of the pocket 2 at the inner side face of the intermediate wall 4 and adjacent inner sides of the pocket 2 so that when the tire is partially compressed, the wearing plates 8 which may be either resilient or flexible will move into contact and eliminate intimate contact of normally spaced faces of the rubber of the tire.

While there are herein shown and described the preferred embodiments of the present invention, it is, nevertheless, to be understood that minor changes may be made therein without departing from the spirit and scope of the invention as claimed.

What is claimed is:—

1. In a cushion tire, a solid tire body having concentric circumferentially extending pockets separated by an intermediate wall, an inwardly directed rib carried by a wall of the outer pocket to engage the outer face of the intermediate wall when the tire is under load, a channel-shaped wear plate inclosing the free side of the rib with the sides of the channel flush with the sides of the rib, and a wear plate set into the outer side of the intermediate wall and flush with the face thereof and being of greater width than the aforesaid wear plate and terminating adjacent the opposite sides of the outer pocket to maintain contact with the aforesaid wear plate upon lateral movement of the tread portion of the tire when under load.

2. In a cushion tire, a solid tire body having concentric circumferentially extending pockets separated by an intermediate wall, an inwardly directed rib carried by a wall of the outer pocket to engage the outer face of the intermediate wall when the tire is under load, a channel-shaped wear plate inclosing the free side of the rib with the sides of the channel flush with the sides of the rib, a wear plate set into the outer side of the intermediate wall and flush with the face thereof and being of greater width than the aforesaid wear plate and terminating adjacent the opposite sides of the outer pocket to maintain contact with the aforesaid wear plate upon lateral movement of the tread portion of the tire when under load, said inner pocket being substantially triangular in cross-section and V-shaped wear plates set into the corners of said pocket.

In testimony whereof I affix my signature.

GEORGE GATIAL.